Feb. 25, 1969 W. BAUKAL 3,429,749
FUEL BATTERY WITH STABILIZED ZIRCONIUM OXIDE ELECTROLYTE
Filed March 25, 1966
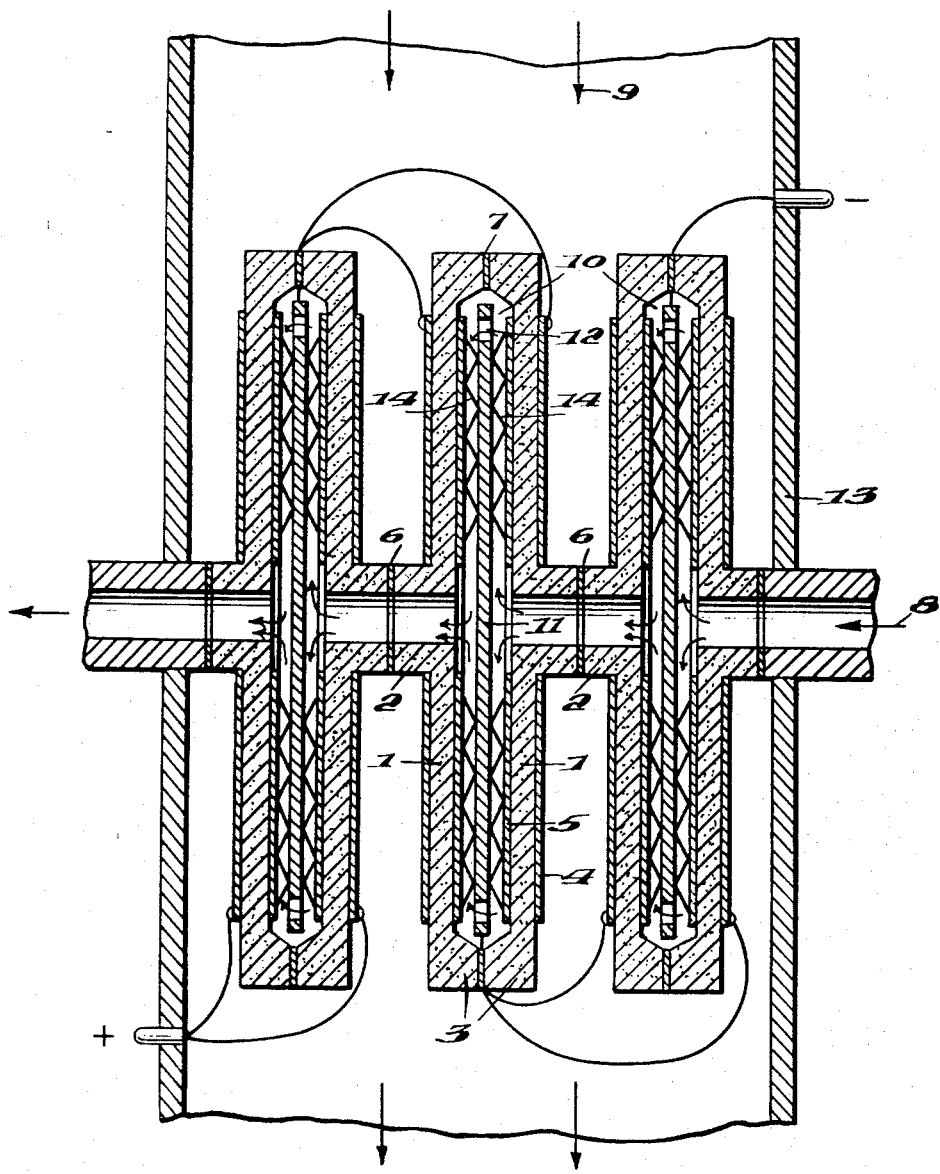
INVENTOR
Werner Baukal
BY Pierce, Scheffler & Parker
ATTORNEYS

United States Patent Office 3,429,749
Patented Feb. 25, 1969

3,429,749
FUEL BATTERY WITH STABILIZED ZIRCONIUM OXIDE ELECTROLYTE
Werner Baukal, Neuenhof, Aargau, Switzerland, assignor to Aktiengesellschaft Brown, Boveri & Cie, Baden, Switzerland, a joint-stock company
Filed Mar. 25, 1966, Ser. No. 537,569
Claims priority, application Switzerland, Apr. 8, 1965, 4,834/65
U.S. Cl. 136—86
Int. Cl. H01m 27/16
13 Claims This invention relates to a fuel battery with a plurality of fuel cells for converting the chemical energy of a combustion gas and a gas containing oxygen into electrical energy.

There are known fuel cells in which the chemical energy of the gases is converted at high temperature, preferably over 800° C., and in which an electrolyte which is solid at these temperatures is used. Stabilized zirconium oxide has proved to be suitable as the solid electrolyte, and the stabilizers chiefly used are calcium oxide, yttrium oxide or oxides of the rare earths. On the one hand, these stabilizers cause the cubic phase to remain stable in the zirconium oxide grid over the whole temperature range. In the case of pure zirconium oxide, a reversible conversion of the monoclinic phase into the tetragonal phase occurs, together with a spontaneous longitudinal contraction of about 3% which leads to fracture of the workpiece. On the other hand, the electrical conductivity of zirconium oxide is sufficiently great at temperatures of over 800° C. only in the presence of the stabilizers mentioned. The quantity of stabilizers used is 5 to 15 mol percent; maximum conductivity also occurs in this range of concentration.

The conductivity must be considered as being pure oxygen-ion conductivity. The conduction mechanism acts via oxygen holes in the anion partial grid. A potential difference therefore occurs in consequence of various oxygen partial-pressures on both sides of a stabilized zirconium oxide disc in contact with a combustion gas and gas containing oxygen. If electrodes in the form of electronic conductors are fitted to both sides of the zirconium oxide disc, current may be fed to a load in the external circuit until the oxygen partial-pressures have become balanced out. If care is taken to provide a continuous gas feed, so that the oxygen partial-pressures are maintained, electrical power can be continuously taken from such a cell.

Air is usually used as the gas having a high oxygen partial-pressure. The gas having a low oxygen partial-pressure is a combustion gas capable of reacting with oxygen, and in which the oxygen partial-pressure sets itself to correspond with the thermodynamic balance. Suitable combustion gases are hydrogen, carbon monoxide, or mixtures of these two gases, or hydrocarbons in pure form or mixed with water vapour.

There is a known fuel battery for operation at temperatures of over 800° C. in which the individual fuel cells are made in the form of short hollow cylinders of stabilized zirconium oxide fitted into one another and in this way forming a long tubular battery. In this case, the electrodes are made of platinum, and a rare-metal solder is used as the seal between the individual cells, which are also connected in series by the said solder. It is above all disadvantageous in this arrangement that tubular pieces of zirconium oxide can at present only be made with relatively high porosity, while on the contrary highly fluid-tight zirconium oxide is desirable as the solid electrolyte for the fuel cells.

Constructional material of stabilized zirconium oxide of sufficiently low porosity is available in the form of plates and discs which can be easily worked by grinding, drilling and other operations. There is a known fuel battery in which stabilized zirconium oxide discs are used as the solid electrolyte, and are covered on both sides with a layer of porous metal such as platinum acting as the electrode. The zirconium oxide discs are stacked upon one another in such a manner as to result in a sequence of zirconium oxide disc-sealing ring—metal contact ring—sealing ring—zirconium oxide disc, etc. The combustion gas and the gas containing oxygen are fed right through the whole stack, while the zirconium oxide discs, sealing rings and contact rings are provided with partially superimposed bores and notches, so that the combustion gas passes over one side of each zirconium oxide disc and the gas containing oxygen over the other side alternately. The individual cells are connected in series electrically by the metal contact rings.

A disadvantage of this known arrangement is that the large number of components used results in numerous joints which must be gas-tight. This is especially the case because both the combustion gas and the gas containing oxygen are passed through the interior of the arrangement. If the individual parts of the stack are held together by pressure exerted from outside, it is difficult to attain the required gas-tightness even if sealing rings are used. If the individual parts are joined to one another with the aid of an enamel-like substance or by a high-temperature solder, the differing coefficients of thermal expansion of the zirconium discs and the metal rings give rise to mechanical stresses which lead to fracturing of the discs. Finally, since in the known arrangement, the gases flow diametrically over the electrolyte discs, it is difficult to avoid the formation of gas pockets on the surfaces of the discs, so that maximum electrical power cannot be taken from the cells.

It is the object of the present invention to provide a fuel battery, free of the disadvantages mentioned, with a plurality of fuel cells for converting the chemical energy of a combustion gas and a gas containing oxygen into electrical energy with a disc-shaped stabilized zirconium oxide solid electrolyte at temperatures of over 800° C. It is more particularly the object of the invention to provide such a fuel battery which is simple in construction, consists essentially of identical components, and comprises a minimum number of gas-tight joints between identical materials. It is a further object of the invention to provide a fuel battery through which the gases pass in simplified fashion, and in which the formation of gas pockets on the surfaces of the electrodes is avoided.

According to the invention, the fuel battery is characterized in that the cells consist of centrally bored stabilized zirconium oxide discs coated on both sides with electrodes, and comprising on one side a central tubular union and on the other side a raised circumferential rim, and in that the discs are placed in sequence against one another in the axial direction by way of the raised rim and the tubular unions alternately, and are joined to one another in mechanically fast and gas-tight fashion, one gas being passed through the tubular unions, and the other gas externally against the discs.

The invention will be more precisely explained with the aid of the single figure, which shows the disc-shaped cells in central section. A fuel battery consisting of 6 fuel cells is shown diagrammatically in the figure as an example of embodiment, and for the sake of greater clarity not to scale. The disc-shaped stabilized zirconium oxide cells 1, besides having a central axial bore, comprise a central tubular union 2 on one side and a raised circumferential rim 3 on the other side. The discs are coated on both sides with the electrodes 4 and 5. All the cells are placed in sequence against one another in the axial direction, so that the tubular unions 2 and the raised rims 3 of adjacent discs lie against one another, and are joined to one another in non-positive fashion by the seals 6 and 7. One gas 8 flows in the direction shown through the tubular unions 2 disposed in a line, and accordingly fills the gas-chambers 10, each chamber being formed by and between two discs 1, thus coming into contact with the inner electrodes 5 of the discs 1. The other gas 9 flows externally for example in the direction shown, against the discs 1, and therefore comes into contact with the outer electrodes 4.

In order to attain as uniform as possible a gas-flow in the gas-chambers 10, it is advantageous to provide a sheet-metal deflector 11 between two discs 1 jointed by way of the raised rims. This piece of sheet metal, made, for example, of nickel, is loosely inserted into the chamber 10, and comprises a plurality of holes or slots 12 at the edge. Its diameter is thus approximately equal to the internal diameter of the raised rims of the discs. The gas-flow passing inside the battery then enters through the first tubular union 2, is deflected by the sheet-metal deflector 11, and flows over the first electrode 5. It passes through the holes 12 into the other half of the chamber 10, and flows over the second electrode 5. It thereupon passes through the next tubular union 2 into the following cell. The arrangement of the sheet-metal deflectors 11 in the cells prevents any concentration polarization from occurring on the electrodes 5. If air, being the gas containing oxygen, is passed through the tubular unions 2, the sheet-metal deflectors 11 prevent nitrogen from collecting in the vicinity of the electrodes. If the combustion gas is passed through the tubular unions 2, the sheet-metal deflectors 11 prevent the reaction products from collecting.

For the same reasons, it is advantageous to direct the outer gas-flow parallel to the discs 1, as shown in the figure. For this purpose, there is a cylindrical tube or a shaft 13 of rectangular cross-section through one of which the gas flows. The discs 1 placed in sequence against one another are arranged with their axes transverse to the direction in which the gas flows in a diameter of the tube or between two opposite walls of the rectangular shaft. In this connection, more than 6 discs may naturally be placed in sequence against one another. It is also possible to arrange a plurality of batteries as shown in the tube or shaft 13 one after the other in the flow direction.

It is expedient to pass the combustion gas through the tubular unions 2, and the gas containing oxygen, in the form of air, through the tube 13 externally against the discs 1. The tube 13 need not then be completely sealed against the external atmosphere, but need only comply with the requirement of heat-insulation. It may accordingly be made from normal fireproof bricks or of scale-resistant steel.

A further advantage of the idea of using air as the gas containing oxygen which is passed externally against the discs in a direction parallel thereto resides in that temperature regulation within the battery may be obtained by regulating the feed of fresh air, and hence such temperature-regulation need not be carried out externally. In addition, temperature-regulation by means of fresh air is attended with little inertia in the arrangement shown. Finally, the battery may easily be rapidly cooled by increasing the feed of fresh air if any operational trouble occurs.

The mechanically fast and gas-tight joints 6 and 7 between the zirconium oxide discs 1 by way of the tubular unions 2 and the raised rims 3 may be made with the aid of an intrinsically known glass or enamel, containing magnesium oxide and aluminum oxide, for example. It is also possible to use a high-temperature metal solder such as gold, an alloy of gold and platinum or other known high-temperature solders for jointing purposes, in which case the points of the zirconium oxide disc to be joined must be previously metallized in known manner.

The electrodes 4 and 5 consist of electronically conductive substances. For example, platinum or palladium may be sprayed or brushed on in intrinsically known manner, and then burned in, thus producing a spongy, porous and gas-permeable structure. A further possibility resides in applying non-metallic materials which conduct in metallic fashion or have semiconductive properties at the operating temperatures of over 800° C., for example, oxides such as iron oxides ($Fe_2O_3$, $Fe_3O_4$).

The individual cells may be connected up in any fashion in series and/or parallel, and connected to the external load. The electrical conductors may be joined to the electrodes directly by a high-temperature-resistant soldered joint or with the aid of a current take-off. In the figure, such current take-offs are shown diagrammatically for the electrodes 5, and designated by 14. A particularly advantageous arrangement for current take-off purposes in the chambers 10 results if the current take-offs 14 are in contact not only with the electrodes 5, but also with the sheet-metal deflectors 11. In this case, the sheet-metal deflector 11 and the current take-offs 14 on both sides may be a single component of undular shape, for example with an embossed waffle pattern or in the form of a corrugated metal sheet. The current is taken from the metal sheet 11, and fed out via an electrical conductor through the seal 7. If the seal 7 consists of a high-temperature metal solder, the sheet-metal deflector is directly soldered to the seal at a plurality of points. If the sheet-metal deflector 11 is electrically connected to the two neighboring electrodes 5, as shown in the figure, the electrodes of one type are connected up in parallel by two zirconium oxide discs forming a gas-chamber in each case. In this case, the other electrodes of the same disc must also be connected up in parallel by an external conductor. The double cells may, however, be connected together in any manner as before, for example in series, as shown diagrammatically in the figure.

It has provide to be possible to make zirconium oxide discs 0.5 mm. in thickness. In addition, it has been proved that a clearance of 1 mm. between two discs separated by the tubular unions, and of 1 mm. between the discs on the side of the gas-chamber, are sufficient, or in other words that it is enough for the tubular union 2 to be 0.5 mm. high and for the raised rim portions 3 to be 0.5 mm. high, in which case the thickness of the nickel sheet metal deflector 11 is about 0.1 mm. This arrangement gives a geometry factor of about 3.5 cm.$^2$ electrolyte surface per cm.$^3$ of space required. With a disc thickness of 0.5 mm., and a cell voltage of 0.5, the associated current density is about 150 m.a./cm.$^2$. With the said geometry factor, the battery has a resultant power density, without any auxiliary appliance such as heat-exchangers, of the order of 250 w./dm.$^3$.

Besides this high power density, the fuel battery which has been described has the advantages that no special gas-pipes are necessary when air is used as the gas containing oxygen, that only two different components are required, namely the electrolyte discs and the sheet-metal gas-deflectors, that for this reason there are fewer joints as compared to the known arrangement with electrolyte discs, and finally that no disadvantageous mechanical stresses due to differing coefficients of thermal expansion can arise, since only identical parts made of zirconium oxide are mechanically joined to one another.

I claim:

1. A fuel battery of the type wherein the chemical energy of a combustion gas and a gas containing oxygen are converted at high operating temperatures of the order of 800° C. and above into electrical energy in a plurality of electrically interconnected fuel cells, each of said cells being comprised of a pair of stabilized zirconium oxide discs serving as a solid electrolyte, each of said discs of each pair having a centrally located through bore, a centrally located tubular union projecting from one face of the disc and a raised rim portion projecting from the opposite face of the disc, electrodes applied to both faces of each disc, each pair of discs being arranged with their rim portions jointed together to establish a chamber therebetween and the tubular unions of adjacent pairs of discs being jointed together, means for passing one of said gases through a continuous passageway established by all of said jointed tubular unions into and out of all of said chambers in series, and means for passing the other of said gases externally of said disc pairs and in contact therewith.

2. A fuel battery as defined in claim 1 and wherein an enamel serves as a means for jointing said discs together at said raised rim portions and at said tubular unions.

3. A fuel battery as defined in claim 1 and wherein a high-melting-point solder serves as a means for jointing said discs together at said raised rim portions and at said tubular unions.

4. A fuel battery as defined in claim 1 wherein the combustion gas is passed through said tubular unions into said cell chambers and wherein air constitutes the oxygen containing gas and is passed externally of the cell chambers in contact with the exterior faces of the discs.

5. A fuel battery as defined in claim 1 and which further includes a sheet metal deflector located within each cell chamber parallel to the discs which form the chamber and which subdivide said chamber into two parts, said metal deflector including apertures adjacent the periphery thereof for passing gas from one part of the chamber to the other.

6. A fuel battery as defined in claim 5 wherein said metal deflectors have a diameter substantially equal to that of the rim portions of said discs.

7. A fuel battery as defined in claim 5 wherein said metal deflectors are secured in position within their respective cell chambers by jointing at their periphery to a high-melting-point solder jointing existing between the raised rim portions of the discs forming the cell chamber.

8. A fuel battery as defined in claim 5 and which further includes means electrically connecting each said sheet metal cell divider to the neighboring electrodes on the inner sides of said discs which form the chamber.

9. A fuel battery as defined in claim 5 wherein each said sheet metal cell divider has an undular configuration and with opposite faces of the cell divider in contact respectively with the electrodes on the inner faces of the two discs forming the cell.

10. A fuel battery as defined in claim 9 wherein each said sheet metal cell divider has an embossed waffle pattern.

11. A fuel battery as defined in claim 9 wherein each said sheet metal cell divider has a corrugated configuration.

12. A fuel battery as defined in claim 1 wherein the gas which is passed externally of the cell chambers is caused to flow in a direction parallel to the faces of said discs.

13. A fuel battery as defined in claim 1 and wherein glass serves as a means for jointing said discs together at said raised rim portions and at said tubular unions.

References Cited

UNITED STATES PATENTS 3,216,911   11/1965   Kronenberg _____ 136—86

ALLEN B. CURTIS, *Primary Examiner.*